J. Calliham,
Excavator.
No. 100,597.
Patented Mar. 8. 1870.

2 Sheets, Sheet 2.

Witnesses:
Robt Hagmann
G. F. Stout

Inventor:
J. Calliham
per Munn & Co
Attorneys.

United States Patent Office.

JAMES CALLIHAM, OF BATON ROUGE, LOUISIANA, ASSIGNOR TO DAVID M. CALLIHAM, OF SAME PLACE.

Letters Patent No. 100,597, dated March 8, 1870.

IMPROVED DITCHING-MACHINE.

The Schedule referred to in these Letters Patent and making part of the same.

*To all whom it may concern:*

Be it known that I, JAMES CALLIHAM, of Baton Rouge, Avoyelles Parish, and State of Louisiana, have invented a new and useful Improvement in Ditchers; and I do hereby declare that the following is a full, clear, and exact description of the same, reference being had to the accompanying drawings making a part of this specification, in which—

Figure 1:
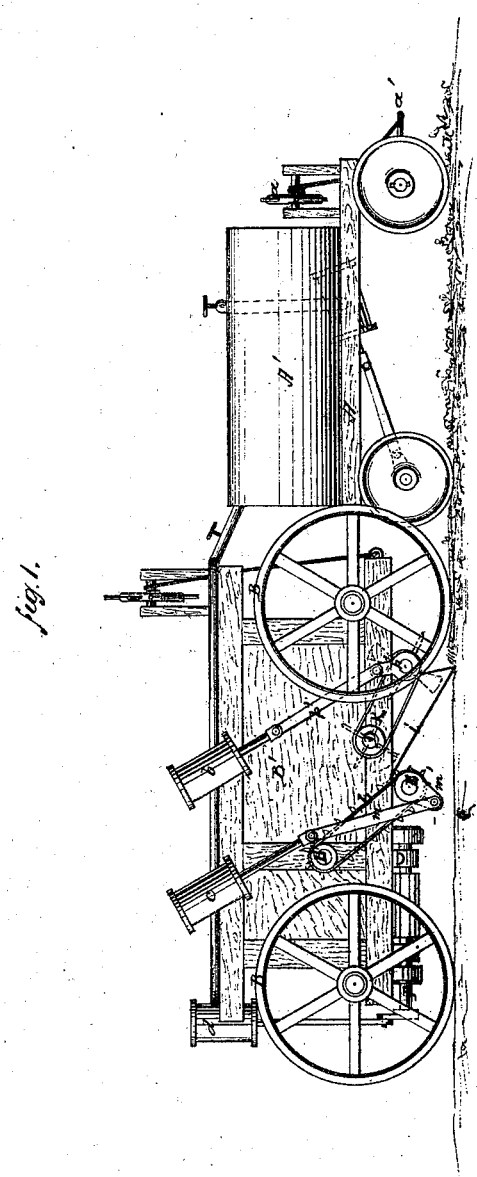
Figure 1 is a side elevation.
Figure 2:
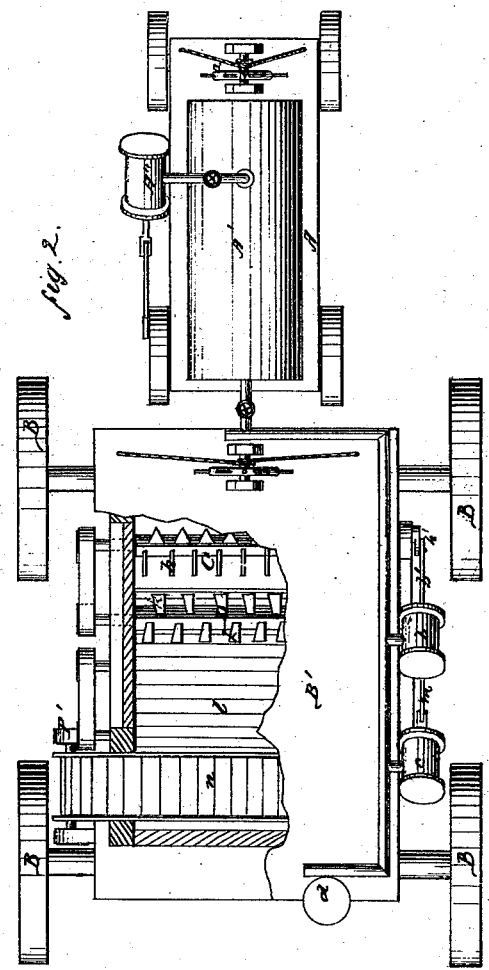
Figure 2 is a plan view with a portion of the top of the inclosing frame broken away, so as to show in part the digging and elevating apparatus.

This invention consists of an apparatus for digging a ditch, and throwing up a lever at one and the same time, said apparatus being operated by steam-engines which it carries, and being drawn forward by a steam-engine placed upon a separate truck, which carries a steam-boiler for supplying all the engines with steam.

In the drawings—

A is the engine-truck which is intended to be propelled somewhat after the manner of an ordinary locomotive, by means of one or more steam-engines.

It has a windlass, $a$, and hand-wheel mounted near its front end in vertical standards, said windlass being connected by ropes with a tongue, $a'$, projecting forward from the front axle.

By rotating the windlass to the proper hand, the direction of the engine-truck may be changed by inclining the front axle and wheels to the line of progress to a greater or lesser degree, as may be desired.

The driving-wheels of the engine-truck are to be made with broad rims, so as to adapt them to move upon the earth whether wet or dry.

The engine-truck is coupled with the ditching apparatus in any convenient manner.

The ditching apparatus rests upon a frame which is supported upon four wheels B, and is inclosed within a casing, B', whose foundation is the aforesaid frame.

The front axle is inclined to the right or left in a similar manner as the front axle of the engine-truck.

Upon the top of the casing B' are three steam-engine cylinders, $b\ c\ d$, which are all supplied with steam from the boiler A' through the pipe $e$.

The shaft C, which is rotated by the reciprocation of the piston of the cylinder $b$ through the medium of the connecting-rod $b'$ and crank, $h'$, is provided with a number of knives, $h$, arranged in a straight row along that part of it inclosed within the casing B', and an equal number of shovel-like tools $h''$ also ranged in a straight row, but projecting from the shaft in an opposite direction to the knives $h$.

The shovels dig up the earth into which they penetrate, and the knives cut roots and other material not severable by the shovels.

The earth taken up by these instruments falls upon an inclined apron, $i$, which extends across the lower part of the casing B' in rear of and beneath the shaft C.

From this apron the earth is swept by fans $k$ projecting in rows in two opposite directions from a shaft D placed parallel to the shaft C in rear and above it, and driven by a band passing around it and the shaft C, or around wheels situated on both shafts.

The fans $k$ sweep the earth upon an endless apron, $l$, placed on the two parallel transverse shafts E E', the lower one of which is operated by a rod, $m$, connecting the crank $m'$ of the shaft E with the piston of the steam-cylinder $c$.

By this means the shaft E is rotated, and gives motion to the endless apron $l$.

From the latter the earth falls on a second inclined endless apron, $n$, whose line of travel is at right angles with that of the apron $l$, and which is placed upon shafts F F' located in the proper direction in the rear part of the casing B', one near its bottom, and the other near its top.

The lower of these shafts F is operated by steam in the cylinder $d$ in like manner as the other shafts, and the upper one F' is driven by a band which receive its motion from the lower shaft.

The apron $n$ discharges its burden to the left of the apparatus, as the latter progresses, and thus either forms or repairs a levee.

The apron $n$ is intended to be so constructed that it may be raised or lowered to suit the different elevation of levees.

The shaft C, with its shovels and knives, digs the ditch, and the apron $n$ builds the levees all at the same operation.

Having thus described my invention,

What I claim as new, and desire to secure by Letters Patent, is—

1. The combination of the ditching and leveeing apparatus herein described with the truck A, when the latter carries the boiler that supplies steam both for drawing and operating the whole apparatus, substantially as described.

2. The shaft C, provided with the shovels $h''$ and knives $h$, in combination with the shaft D, provided with the fans $k$, and with the inclined apron $i$, all arranged and operating substantially as described.

3. The combination of the subject of the second claim with the endless aprons $l\ n$, arranged as and for the purpose specified.

JAS. CALLIHAM.

Witnesses:
 THOS. H. MEARS,
 W. B. COOPER.